United States Patent [19]

Knoerr et al.

[11] Patent Number: 4,959,203
[45] Date of Patent: Sep. 25, 1990

[54] PREPARATION OF COPPER ARSENATE

[75] Inventors: Susan B. Knoerr, Castlegar, Canada; Robert G. Robins, Lindfield, Australia

[73] Assignee: Cominco Ltd., Vancouver, Canada

[21] Appl. No.: 399,195

[22] Filed: Aug. 28, 1989

[51] Int. Cl.$^5$ .................. C01G 28/02; C01G 3/00
[52] U.S. Cl. ..................... 423/602; 423/42; 423/43; 423/87; 424/622
[58] Field of Search .............. 423/42, 43, 47, 601, 423/602, 87, 617, 34, 36; 424/622, 626, 630; 252/385; 106/15.05

[56] References Cited

U.S. PATENT DOCUMENTS

| | | | |
|---|---|---|---|
| 4,049,514 | 9/1977 | Freeman et al. | 423/43 |
| 4,244,734 | 1/1981 | Reynolds et al. | 423/39 |
| 4,357,261 | 11/1982 | Takahashi et al. | 106/15.05 |
| 4,405,569 | 9/1983 | Dienstbach | 423/602 |
| 4,797,281 | 1/1989 | Broome et al. | 424/626 |

Primary Examiner—Robert L. Stoll
Assistant Examiner—Steven J. Bos
Attorney, Agent, or Firm—Arne I. Fors

[57] ABSTRACT

Copper arsenate, substantially free from impurities that will form a sludge in the process for producing wood preservatives such as chromated copper aresenate and having a water content of less than 15%, is prepared by mixing a solution of soluble arsenate and a copper sulfate solution, either or both solutions containing sludge-forming impurities, to form a copper and arsenic-containing solution without precipitating copper arsenate. The pH during the adding is controlled at a value in the range of 1.7 to 2.2 to precipitate impurities. Precipitated impurities are removed, and the copper and arsenic-containing solution is neutralized with a suitable alkaline substance, preferably dilute sodium hydroxide solution, to pH 3.2 to 4.2 to precipitate copper arsenate. The water content of the copper arsenate is reduced by adding to the copper and arsenic-containing solution, either in the mixing of arsenate solution with copper sulfate solution or in the precipitation of copper arsenate, an amount of soluble chromium in the range of about 0.005 to 0.250 gram chromium per liter of solution.

12 Claims, 1 Drawing Sheet

PREPARATION OF COPPER ARSENATE

This invention relates to copper arsenate and, more specifically, to improvements in a method for the preparation of copper arsenate.

BACKGROUND OF THE INVENTION

Copper arsenate finds application in wood preservatives such as chromated copper arsenate. Chromated copper arsenate is generally made by dissolving the oxides of the constituent elements or by dissolving copper arsenate in chromic acid. Copper arsenate could be prepared by reacting solutions of a soluble arsenate and copper sulfate that are obtained from metallurgical processes that include leaching of arsenic- containing materials and copper-containing materials.

Processes for making copper arsenate have been disclosed such as in Canadian Patents 1 094 973 and 1 029 298, German Offen. DE 3 048 404 and U.S. Pat. No. 4 405 569.

The copper arsenate prepared from such processes has, generally, too high an impurity content to be acceptable under new specifications that require the total lead and iron content to be less than 0.1% by weight.

A method for the preparation of a low impurity-containing copper arsenate that meets the specifications has been disclosed in co-pending U.S. Patent Application No. 239 897 assigned to the same assignee as the instant invention. According to this method, a solution of a soluble arsenate is added to copper sulfate solution, either or both solutions containing sludge-forming impurities, to form a copper and arsenic-containing solution without precipitating copper arsenate but precipitating the impurities by controlling the pH. After removal of precipitated impurities, the solution is neutralized to precipitate copper arsenate, and copper arsenate substantially free of impurities is recovered.

Although the impurity content of the copper arsenate product from this process is within the specifications, the method has the serious disadvantage that the water content of the copper arsenate is too high, usually 20% or higher. The high water content adds to transportation costs or requires additional processing to reduce it to an acceptable level of less than about 15%. The water can be removed by drying, but this is expensive and causes hygiene problems in the work place.

SUMMARY OF THE INVENTION

We have now found that the water content of copper arsenate may be reduced to acceptable levels when the addition of arsenate solution to copper sulfate solution to form a copper and arsenic-containing solution or the neutralization of the copper and arsenic-containing solution to precipitate copper arsenate in the process according to the aforesaid co-pending application, is carried out in the presence of an amount of soluble chromium in the range of about 0.005 to 0.250 gram of chromium per liter of solution.

The water content of the copper arsenate recovered from the process is reduced to less than 15%. The water content of the copper arsenate is further reduced by carrying out the precipitation of copper arsenate by the slow addition of dilute sodium hydroxide solution, containing 20 to 50 g sodium hydroxide per liter to a pH in the range of about 3.2 to 4.2, preferably to the optimum value of about 3.5.

It is, therefore, the object of the present invention to provide a method for the preparation of substantially pure copper arsenate with an acceptable, low water content. This and other objects will become apparent from the following detailed description.

Accordingly, there is provided in a method for the preparation of copper arsenate comprising the steps of adding to an addition a solution of water soluble arsenate and a copper sulfate solution, at least one of the arsenate solution and the copper sulfate solution containing sludge-forming impurities, to form a copper and arsenic-containing solution without precipitating copper arsenate, the amount of copper and the amount of arsenic in said copper and arsenic-containing solution being such that copper arsenate can be formed; causing said impurities to precipitate by controlling the pH at a value in the range in which said sludge-forming impurities precipitate and in which copper arsenate does not precipitate; separating precipitated impurities from said copper and arsenic-containing solution; neutralizing said copper and arsenic-containing solution in a precipitation to precipitate copper arsenate; and recovering copper arsenate substantially free from said sludge-forming impurities, and having a water content, the improvement comprising lowering said water content by adding to said copper and arsenic-containing solution an amount of soluble chromium in the range of about 0.005 to 0.250 gram of chromium per liter of said solution.

BRIEF DESCRIPTION OF THE DRAWING

The embodiments of the invention will now be described in detail with reference to the accompanying drawing in which.

DETAILED DESCRIPTION

Figure 1:
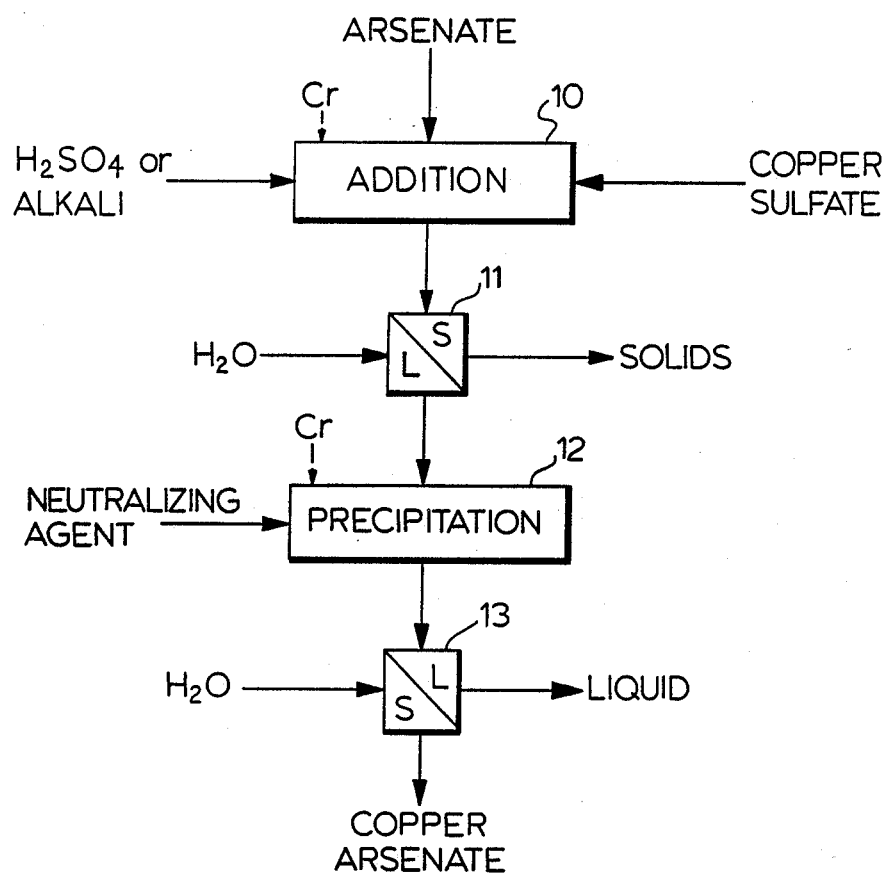
FIG. 1 is a schematic flowsheet of the preparation of copper arsenate from soluble arsenate and copper sulfate solutions.

The method of the present invention is an improvement in the method for the preparation of copper arsenate disclosed in co-pending U.S. Patent Application No. 239 897 filed on Sept. 2, 1988 assigned to the same assignee as the instant invention and hereby incorporated by reference. Generally, the method claimed in the co-pending application comprises the steps of adding a solution of water soluble arsenate to a copper sulfate solution, either one or both of these solutions containing sludge-forming impurities, to form a copper and arsenic-containing solution without precipitating copper arsenate, the amount of copper and the amount of arsenic in the copper and arsenic-containing solution being such that copper arsenate can be formed; causing impurities to precipitate by controlling the pH in the range in which sludge-forming impurities precipitate, and in which copper arsenate does not precipitate; separating precipitated impurities from the copper and arsenic-containing solution; neutralizing the copper and arsenic-containing solution to precipitate copper arsenate; and recovering copper arsenate substantially free from sludge-forming impurities.

With reference to FIG. 1, soluble arsenate and copper sulfate are fed to an addition 10. Soluble arsenate is preferably fed to addition 10 in the form of a solution. Such solution may contain impurities such as, for example, $SiO_2$, Fe, Pb and Sb. The solution of water-soluble arsenate may be derived from at least one arsenic-containing compound capable of yielding a water-soluble arsenate. The compounds can be chosen from arsenic oxides, soluble arsenic salts and compounds, and suitable metallurgical materials that may include ores, concentrates, speisses, slags, fumes, flue dusts and the like. Alternatively, the solution of arsenate may, for example, be an arsenate solution, e.g. arsenic acid, derived from a solvent extraction process. Any arsenite is easily converted to arsenate by any one of a number of oxidation methods known in the art. It is noted that industrial and most commercial-grades of arsenic oxides and arsenic compounds and, of course, the arsenates derived from metallurgical materials, contain impurities. The preferred soluble arsenate solutions are aqueous solutions of sodium arsenate, ammonium arsenate and arsenic acid.

Copper sulfate is fed to addition 10 in the form of copper sulfate crystals that may contain occluded impurities such as fine lead sulfate, or as a copper sulfate solution containing dissolved impurities such as Fe, $SiO_2$ and Pb. The copper sulfate solution may be derived from at least one copper-containing compound capable of yielding copper sulfate. The compound can be chosen from copper sulfate, copper oxides and metallurgical materials that may include ores, concentrates, speisses, slags, slimes, dusts, mattes, copper scrap and the like. It is noted that copper sulfate crystals, copper oxides, and copper sulfate derived from metallurgical materials usually contain impurities. The copper sulfate solution may also contain sulfuric acid as well as dissolved metals such as As, Sb, Zn, Cd, In, Ni and Co.

In addition 10, water soluble arsenate is mixed with copper sulfate solution. The addition 10 may be carried out by adding arsenate solution to copper sulfate solution or by adding copper sulfate solution to arsenate solution, the addition of arsenate solution to copper sulfate solution being preferred. Either one solution or both solutions may contain impurities. The addition 10 is preferably carried out with agitation. The conditions in addition 10 are controlled such that substantially no copper arsenate precipitates.

The quantity of arsenate and the quantity of copper sulfate fed to addition 10 are controlled to form a copper and arsenic-containing solution which contains the amounts of arsenic and copper necessary to form copper arsenate in a subsequent step (to be described). The weight ratio of copper to arsenic in the solutions fed to addition 10 is controlled at a value of about unity, but higher ratios may be used.

The copper sulfate and arsenate solutions are combined in addition 10 for the formation of a copper and arsenic-containing solution, but without precipitating copper arsenate. The addition 10 is carried out at a temperature in the range of about 60 to 100° C. and, preferably, at a temperature of about 80° C. The pH during addition must be controlled in a range in which sludge-forming impurities precipitate, but in which copper arsenate does not commence to precipitate. Specifically, to prevent copper arsenate from precipitating, the pH in the addition must be controlled at values of less than about 2.2. A pH not lower than about 1.7 is necessary for the precipitation and removal of the sludge-forming impurities, especially iron, lead and antimony. The pH in addition 10 is, therefore, controlled at values below about 2.2 and preferably in the range of about 1.7 to 2.2, causing the sludge-forming impurities to precipitate. Most preferably, the pH is controlled at a value of about 1.8. Depending on the pH of the arsenate solution and the copper sulfate, an amount of sulfuric acid or alkaline substance may be added in order to control the pH in addition 10 in the desired range. The retention time in addition 10 should be sufficient to cause precipitation of precipitating impurities to required low levels. The retention time is, in the range of about 0.5 to 5 hours, the preferred retention times being in the range of about 3 to 5 hours. The preferred times result in an increased precipitation of impurities.

The water content of copper arsenate to be precipitated and recovered from the copper arsenate precipitation 12, to be described, is reduced by the addition of a small quantity of soluble chromium in addition 10 or in precipitation 12. The term soluble chromium means a form of chromium soluble in the copper and arsenic-containing solution such as trivalent or hexavalent chromium salts. Although not bound by theoretical considerations, it is believed that chromium acts as a crystal habit modifier. The reduction in water content of the copper arsenate product is achieved by adding the small quantity of chromium in addition 10 or, alternatively, in precipitation 12 to be described. The chromium may be added as a solution of a chromium salt such as, for example, sodium chromate or bichromate, or may be added in the form of a solid or a sludge containing soluble chromium. An amount of chromium is added such that the concentration of chromium in the volume of material in either addition 10 or precipitation 12 is in the range of about 0.005 to 0.250 g/L of the copper and arsenic-containing solution. The preferred amount is in the range of about 0.03 to 0.20 gram of chromium per liter of solution. In addition 10, the soluble chromium is added to the copper sulfate solution prior to any addition of arsenate solution.

After the addition and mixing in addition 10 has been completed, the copper and arsenic-containing solution and precipitated impurities are passed to a liquid/solids separation 11, wherein the solids are separated, preferably by filtration, from the copper and arsenic-containing solution. The solids are washed with water on the filter to reduce the amounts of dissolved arsenic and copper that may accompany the solids. The solids, which include compounds such as iron arsenate, lead sulfate, antimony compounds and silica, are removed from the process.

The copper and arsenic-containing solution from separation 11 is subsequently neutralized in copper arsenate precipitation 12 to precipitate copper arsenate. A suitable alkaline neutralizing agent, such as sodium hydroxide, potassium hydroxide, ammonia or ammonium hydroxide, and preferably in the form of a solution, is added to increase the value of the pH above about 2.2, above which value copper arsenate commences precipitation. The pH is preferably controlled in the range of about 3.2 to 4.2. Below a pH of 3.2 precipitation is only partly complete, and at a pH above about 4.2 undesirable species of copper arsenate and/or copper oxide may precipitate. The optimum value of the pH is 3.5. Precipitation 12 is carried out at a temperature in the range of about 60° to 90° C., preferably at about 80° C.

Precipitation 12 is preferably carried out by adding a sodium hydroxide solution. The sodium hydroxide solution is preferably a dilute solution containing sodium hydroxide in a concentration in the range of about 20 to 50 g/L, preferably about 40 g/L. Below 20 g/L, the solution is too dilute, and about 50 g/L the water content of the copper arsenate increases above about 15% in the absence of added soluble chromium. Preferably, the dilute sodium hydroxide solution is added slowly, for example, over a period of about 60 to 120 minutes, until the pH of the material in precipitation 12 reaches an optimum value of about 3.5. The slow addition of dilute solution to the optimum pH value contributes to the reduction in water content of the copper arsenate (after filtration). When carrying out the precipitation 12 with 20 to 50 g/L sodium hydroxide solutions to pH values in the range of about 3.2 to 4.2, the water contents of recovered copper arsenate are further reduced by the addition of soluble chromium.

The addition of chromium to precipitation 12 has been discussed with reference to addition 10. The addition of trivalent or hexavalent chromium in an amount in the range of about 0.005 to 0.250 g/L of copper and arsenic-containing solution, preferably about 0.03 to 0.20 g/L, effectively reduces the water content of the recovered copper arsenate product. The soluble chromium is added to the copper and arsenic-containing solution prior to addition of neutralizing agent. The most preferred conditions under which to carry out precipitation 12 are the use of 40 g/L sodium hydroxide solution slowly added to copper and arsenic-containing solution, to which 0.03 to 0.20 g/L soluble chromium has been added, until a pH of 3.5 has been reached.

After copper arsenate precipitation is complete, the material from precipitation 12 is subjected to liquid-solids separation 13, wherein a liquid fraction is separated from the solid copper arsenate. The liquid fraction is removed from the process. The solids fraction is washed and copper arsenate substantially free of impurities that may form a sludge in the preparation, storage or application of wood preservatives and having a low water content, is recovered as product. The copper arsenate contains not more than about 0.1% total of iron and lead by weight and has a water content of less than 15% and usually in the range of 3% to 15% by weight. If desired, the copper arsenate may be mixed with arsenic acid and chromic acid in the appropriate proportions to form chromated copper arsenate. The lowest water contents are obtained when, in addition to the use of soluble chromium, the addition 10 and the precipitation 12 are carried out under the preferred conditions discussed above.

The invention will now be illustrated by means of the following non-limitative examples.

EXAMPLE 1

For comparison, copper arsenate was prepared according to the disclosures in the co-pending application (supra). Copper arsenate was precipitated from a copper and arsenic-containing solution prepared by adding a filtered sodium arsenate solution, preneutralized to pH 7 with sulfuric acid, to a copper sulfate solution at 80° C. over a period of 60 minutes. The copper and arsenic-containing solution was adjusted by addition of sulfuric acid to a pH of 2.2, and precipitated impurities were removed. A 150 g/L sodium hydroxide solution was added over a period of 40 minutes to the copper and arsenic-containing solution at 80° C. with vigorous agitation until a pH of 5.0 was attained. The resulting slurry was filtered, the cake was washed with water and air blown. The mass balance and analyses are given in Table I.

TABLE I

| | Weight (kg) or Volume (L) | pH | Analysis (g/L or %) | | | | | | | |
|---|---|---|---|---|---|---|---|---|---|---|
| | | | Cu | As | Pb | Fe | Sb | Na | Cl | H$_2$O |
| Purified Cu—As Solution | 175 | 2.16 | 30 | 28 | 0.025 | 0.008 | 0.11 | — | — | — |
| Cu As Product | 22.7 | — | 31.5 | 31.8 | 0.028 | 0.01 | 0.12 | 2.8 | 0.05 | 31.5 |
| Residual Solution | 210 | 5.01 | 0.18 | 0.58 | <0.001 | <0.001 | 0.002 | 57 | — | — |
| | | | % Distribution Based on Output | | | | | | | |
| Cu As Product | | | 99.2 | 97.5 | 100 | 100 | 97.7 | 3.4 | 100 | — |
| Residual Solution | | | 0.8 | 2.5 | 0 | 0 | 2.3 | 96.6 | 0 | — |

As can be seen from Table I, the copper arsenate product contained 0.1% of sludge-forming impurities (Pb, Fe and Sb), but the water content of the product was 31.5%. In a number of other, similar tests, the water contents of the copper arsenate products were all above 20%.

EXAMPLE 2

This example illustrates the method according to the invention wherein the addition was carried out at a pH of 1.8, and the precipitation was carried out with slow addition of dilute sodium hydroxide solution to a pH of 3.5. A volume of copper sulfate solution containing 96 g/L Cu, 14.4 g/L As, 1.1 g/L Zn and 1.1 g/L Cd and a volume of sodium arsenate solution containing 80 g/L As, 100 ppm Sb, 86 g/L Na and 1.6 g/L Pb were heated to 80° C. The arsenate solution was pumped into the copper sulfate solution until the copper to arsenic weight ratio was 1:1. The pH was maintained at a value of 1.8. 5 g/L Dicalite 4200 was added and the slurry was agitated for 30 minutes. The slurry was then vacuum-filtered to remove precipitated impurities. The resulting solution contained 55 g/L Cu and 54 g/L As. 0.5L of this solution was reheated to 80° C. and neutralized to precipitate copper arsenate by the slow addition of a sodium hydroxide solution containing 40 g/L NaOH until a pH of 3.5 was reached. The addition time was 90 minutes. The slurry was filtered, washed with hot water, and air-blown for two minutes. The moisture content in the copper arsenate was determined to be 11.5%.

EXAMPLE 3

This example illustrates the water content-reducing effect of the addition of soluble chromium to the addition step. Arsenate solution of Example 1 was added to copper sulfate solution containing 100 ppm chromium as sodium chromate until the Cu:As ratio was 1:1. The solution was then further treated as in Example 1 to obtain copper arsenate. The moisture content of the copper arsenate was determined to be 8.7%. As can be seen by comparing the water contents of Examples 2 and 3, the addition of soluble chromium in the addition of arsenate solution to copper sulfate solution reduces the water content of the copper arsenate.

EXAMPLE 4

This example illustrates the effect of the final value of the pH in the neutralization of copper and arsenic-containing solution at 80° C. with a sodium hydroxide solution containing 40 g/L NaOH added over a period of 90 minutes. The copper and arsenic-containing solution was prepared as in Example 1 and contained 44.3 g/L Cu and 46.6 g/L As. 450 mL portions of solution were neutralized at 80° C. to different final pH values and the copper arsenate was recovered as in Example 1. The water contents were determined. In some tests 100 ppm soluble chromium were added. The conditions and the results are shown in Table II.

TABLE II

| Test No. | Final pH | Chromium Added in ppm | Moisture Content in % |
|---|---|---|---|
| 1 | 3.25 | none | 12.9 |
| 2 | 3.50 | none | 11.3 |
| 3 | 3.50 | none | 10.0 |
| 4 | 3.50 | 100 | 7.2 |
| 5 | 3.25 | none | 13.4 |
| 6 | 4.00 | none | 14.0 |
| 7 | 4.00 | none | 12.2 |
| 8 | 4.00 | none | 13.4 |
| 9 | 4.00 | 100 | 9.4 |
| 10 | 4.25 | none | 15.3 |
| 11 | 4.25 | 100 | 11.2 |

It can be seen from the results that a final pH in the neutralization of about 3.5 gives the lowest moisture contents in the precipitated copper arsenate, and that the addition of soluble chromium effectively reduces the moisture content.

EXAMPLE 5

This example illustrates the effect of the concentration of sodium hydroxide in the solution used for neutralizing the copper and arsenic-containing solution. Using the same copper and arsenic-containing solution as in Example 4, 450 mL portions of solution were neutralized at 80° C. to a final pH value of 3.5 with solutions containing varying concentrations of sodium hydroxide. The precipitated copper arsenate was recovered as in Example 1, and moisture contents were determined. In some tests soluble chromium was added. The conditions and results are shown in Table III.

TABLE III

| Test No | Chromium Added in ppm | Sodium Hydroxide Concentration in g/L | Moisture Content in % |
|---|---|---|---|
| 1 | none | 30 | 8.3 |
| 2 | none | 40 | 10.0 |
| 3 | 100 | 40 | 7.2 |
| 4 | none | 50 | 13.5 |
| 5 | none | 50 | 14.9 |
| 6 | none | 50 | 15.8 |
| 7 | 100 | 50 | 8.2 |
| 8 | none | 60 | 18.1 |

It can be seen from the results that at pH 3.5, 30 and 40 g/L sodium hydroxide solution gives water contents below 15% and 50 g/L requires a small amount of soluble chromium to give water contents consistently below 15%.

EXAMPLE 6

Using the method and conditions as in Example 2, varying amounts of sodium dichromate were added either in the addition of arsenate solution to copper sulfate solution or in the neutralization of the copper and arsenic-containing solution for the precipitation of copper arsenate. The moisture contents of the copper arsenate products were determined. The conditions and the results are given in Table IV.

TABLE IV

| Cu & As Solution | | Chromium Added to addition in ppm | Chromium Added to precipitation in ppm | Moisture content in % |
|---|---|---|---|---|
| Cu g/L | As g/L | | | |
| 46 | 52 | none | — | 21.9 |
|  |  | 30 | — | 13.6 |
|  |  | 60 | — | 11.9 |
|  |  | 100 | — | 11.2 |
| 45 | 50 | — | none | 16.4 |
|  |  | — | 50 | 10.8 |
|  |  | — | 100 | 12.7 |
|  |  | — | 200 | 10.2 |

As can be seen from the results, moisture contents of copper arsenate are effectively reduced from over 15% to below 15% with the addition of a small amount of soluble chromium in the range from 30 to 200 ppm to either the addition or the precipitation steps of the process.

It is understood that changes and modifications may be made in the method according to the invention without departing from the scope and purview of the appended claims.

We claim:

1. In a method for the preparation of copper arsenate comprising the steps of adding a solution of water soluble arsenate to a copper sulfate solution, at least one of the arsenate solution and the copper sulfate solution containing sludge-forming impurities, to form a copper and arsenic-containing solution without precipitating copper arsenate, the amount of copper and the amount of arsenic in said copper and arsenic-containing solution being such that copper arsenate can be formed; causing said impurities to precipitate at a value of pH less than about 2.2 at which said sludge-forming impurities precipitate and in which copper arsenate does not precipitate; separating precipitated impurities from said copper and arsenic-containing solution; neutralizing said copper and arsenic-containing solution in a precipitation to precipitate copper arsenate; and recovering copper arsenate substantially free from said sludge-forming impurities, and having a water content, the improvement comprising lowering said water content by adding to said copper and arsenic-containing solution an amount of chromium, soluble in said copper and arsenic-containing solution in the range of about 0.005 to 0.250 gram of chromium per liter of said copper and arsenic-containing solution.

2. The improvement as claimed in claim 1, wherein the weight ratio of copper in said copper sulfate solution to arsenic in said arsenate solution step has a value of about unity.

3. The improvement as claimed in claim 1, wherein said pH step has a value in the range of about 1.7 to 2.2.

4. The improvement as claimed in claim 1, wherein the retention time of said copper and arsenic-containing solution in the step of adding a water soluble arsenate solution to a copper sulfate solution is in the range of about 0.5 to 5 hours.

5. The improvement as claimed in claim 1, wherein said chromium is added in an amount in the range of about 0.03 to 0.20 gram of chromium per liter of said copper and arsenic-containing solution, the weight ratio of copper in said copper sulfate solution to arsenic in said arsenate solution has a value of about unity, said pH has a value of about 1.8, the retention time is in the range of about 3 to 5 hours, and said chromium is added prior to adding arsenate solution.

6. The improvement as claimed in claim 1, wherein said precipitation is carried out with a solution of sodium hydroxide containing sodium hydroxide in the range of about 20 to 50g/L.

7. The improvement as claimed in claim 1, wherein said precipitation is carried out with a solution of sodium hydroxide and said solution of sodium hydroxide is added until the pH reaches a value in the range of about 3.2 to 4.0.

8. The improvement as claimed in claim 1, wherein said chromium is added to said precipitation in an amount in the range of about 0.03 to 0.20 gram of chromium per liter of said copper and arsenic-containing solution, said precipitation is carried out with a solution of sodium hydroxide containing about 40 g sodium hydroxide per liter, said sodium hydroxide solution is added over a period of time in the range of about 60 to 120 minutes and to a value of the pH of about 3.5, and said chromium is added prior to adding said sodium hydroxide solution.

9. The improvement as claimed in claim 1, wherein said water content is lowered to a value in the range of about 3 to 15% by weight of copper arsenate.

10. The improvement as claimed in claim 5, wherein said water content is lowered to a value in the range of about 3 to 15% by weight of copper arsenate.

11. The improvement as claimed in claim 8, wherein said water content is lowered to a value in the range of about 3 to 15% by weight of copper arsenate.

12. The improvement as claimed in claim 1, wherein said copper arsenate has a combined lead and iron content of less than about 0.1% by weight.

* * * * *